United States Patent [19]

Takemoto et al.

[11] Patent Number: 5,409,671

[45] Date of Patent: Apr. 25, 1995

[54] CATALYTIC CONVERTER FOR TREATING EXHAUST GAS

[75] Inventors: Takashi Takemoto; Yasuto Watanabe; Masahiko Shigetsu; Kazunari Komatsu; Makoto Kyogoku, all of Hiroshima, Japan

[73] Assignee: Mazda Motor Corporation, Hiroshima, Japan

[21] Appl. No.: 216,249

[22] Filed: Mar. 21, 1994

Related U.S. Application Data

[63] Continuation of Ser. No. 990,267, Dec. 14, 1992, abandoned.

[30] Foreign Application Priority Data

Dec. 26, 1991 [JP] Japan .................................. 3-343705

[51] Int. Cl.[6] ............................................. B01D 53/36
[52] U.S. Cl. .................................. 422/180; 423/213.2; 423/213.5; 502/65; 502/66; 502/67; 502/69; 502/71; 502/73; 502/74; 502/77; 502/87
[58] Field of Search .................................. 422/177, 180; 423/213.2, 213.5; 502/65-67, 69, 71, 73, 74, 77, 87

[56] References Cited

U.S. PATENT DOCUMENTS

| | | | |
|---|---|---|---|
| 3,896,616 | 7/1975 | Keith et al. | 422/171 |
| 4,432,207 | 2/1984 | Davis, Jr. et al. | 422/179 |
| 4,962,075 | 10/1990 | Green et al. | 502/64 |
| 5,047,378 | 9/1991 | Kato et al. | 502/60 |
| 5,047,379 | 9/1991 | Alyea et al. | 502/60 |
| 5,085,762 | 2/1992 | Absil et al. | 502/67 |
| 5,116,579 | 5/1992 | Kobayashi et al. | 422/177 |
| 5,155,077 | 10/1992 | Montreuil et al. | 502/66 |
| 5,164,350 | 11/1992 | Abe et al. | 502/66 |

Primary Examiner—Timothy M. McMahon
Attorney, Agent, or Firm—Sixbey, Friedman, Leedom & Ferguson; Gerald J. Ferguson; Donald R. Studebaker

[57] ABSTRACT

A catalytic convertor for treating exhaust gas includes a first catalyst layer formed on a base material and a second catalyst layer formed on the first catalyst layer. The first catalyst layer is composed of metal-containing silicate provided with transition metal by ion exchange and at least one precious metal borne on the silicate, and the second catalyst layer is composed of metal-containing silicate provided with transition metal by ion exchange and at least one metal borne on the silicate which is selected from the group consisting of Zr, Co, Cu, Cr, Mn, Y, Fe, Ni, V, Ti, Zn, Ga, Ba, Mg, La, Ce, Pr, Nd, Sm and Tb and differs from the transition metal provided on the silicate by ion exchange.

11 Claims, 4 Drawing Sheets

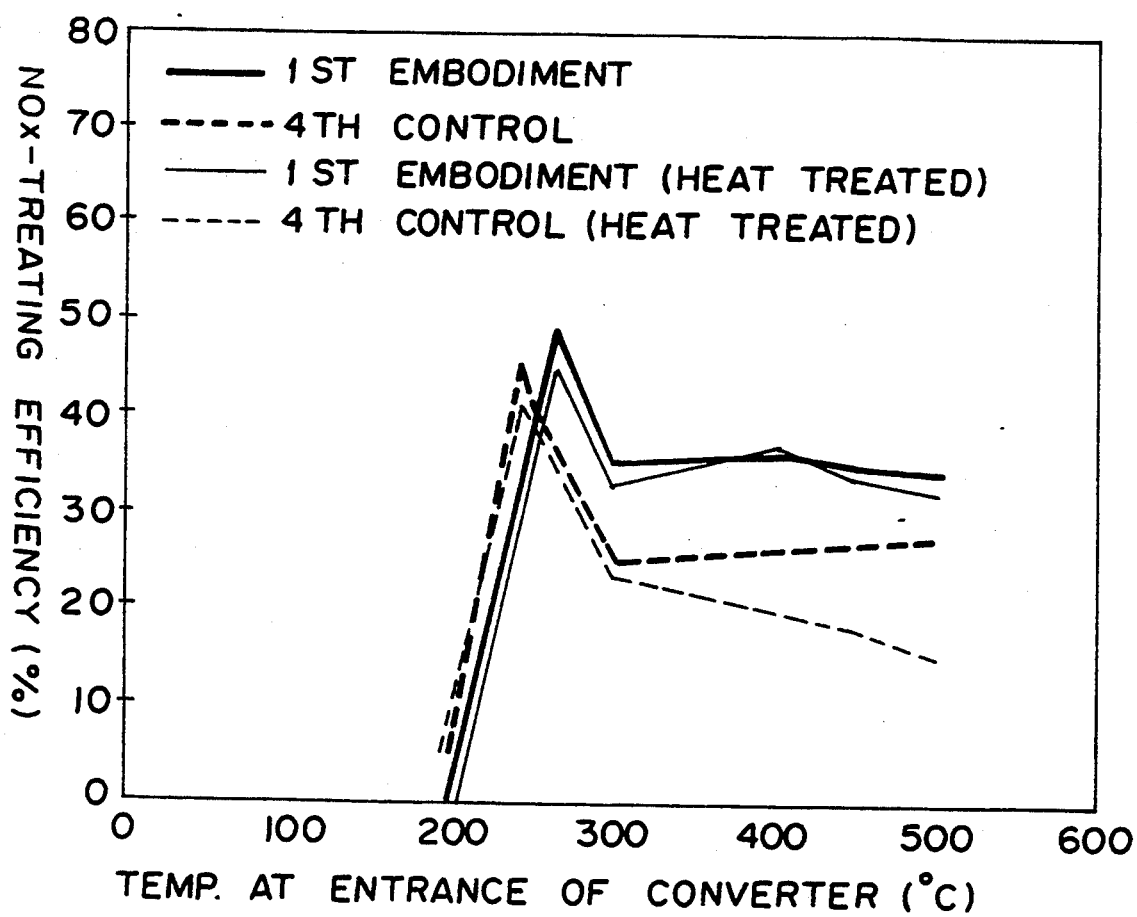
F I G. 2

CATALYTIC CONVERTER FOR TREATING EXHAUST GAS

This application is a Continuation of Ser. No. 07/990,267, filed Dec. 14, 1992, now abandoned.

BACKGROUND OF THE INVENTION

1. Field of the Invention

This invention relates to a catalytic convertor for treating exhaust gas.

2. Description of the Prior Art

As a catalyst for treating exhaust gas, there has been wide known a ternary catalyst which oxidizes CO and HC and reduces NOx. The ternary catalyst comprises, for instance, $\gamma$-alumina bearing thereon Pt and Rh and is most effective when the air-fuel ratio is equal to the stoichiometric air-fuel ratio (i.e., 14.7).

On the other hand, from the viewpoint of fuel economy, it is preferred that the air-fuel ratio be higher than the stoichiometric air-fuel ratio. However when the air-fuel ratio is lean, oxygen concentration in exhaust gas becomes too high and the ternary catalyst cannot reduce NOx though it can oxidize CO and HC.

Recently, a zeolite catalyst bearing thereon transition metal coated by ion exchange is under intensive investigation. Such a zeolite catalyst can decompose NOx into $N_2$ and $O_2$ by catalytic cracking directly or by existence of a reducing agent (e.g., CO, HC or the like) even in a lean atmosphere where oxygen concentration in exhaust gas is high.

For example, it is proposed in Japanese Unexamined Patent Publication No. 1(1989)-310742 to improve NOx treating performance in a wide temperature range from a low temperature to a high temperature by providing a catalytic layer of zeolite with Cu by ion exchange and with precious metal.

However such a precious-metal-bearing Cu-ion exchange zeolite catalyst does not have an enhanced activity though having a widened active temperature range.

SUMMARY OF THE INVENTION

In view of the foregoing observations and description, the primary object of the present invention is to provide a catalytic convertor for treating exhaust gas which has a widened active temperature range and an enhanced activity, i.e., an increased NOx-treating efficiency.

In accordance with our investigation, the above object can be accomplished by a catalytic convertor having a pair of catalyst layers formed one on another, one catalyst layer composed of metal-containing silicate provided with transition metal by ion exchange and precious metal borne on the silicate, and the other catalyst layer composed of metal-containing silicate provided with transition metal by ion exchange and metal which is borne on the silicate and exhibits $O_2$-spillover effect. Like Cu-ion exchange zeolite, the metal-containing silicate provided with transition metal by ion exchange is crystalline microporous material.

That is, the catalytic convertor in accordance with the present invention comprises a first catalyst layer formed on a base material and a second catalyst layer formed on the first catalyst layer. The first catalyst layer is composed of metal-containing silicate provided with transition metal by ion exchange (as a mother material) and at least one precious metal borne on the silicate. The second catalyst layer is composed of metal-containing silicate provided with transition metal by ion exchange and at least one metal borne on the silicate which is selected from the group consisting of typical transition metals such as Zr, Co, Cu, Cr, Mn, Y, Fe, Ni, V, Ti and Zn, typical metal elements such as Ga, Ba and Mg, and lanthanoide series elements such as La, Ce, Pr, Nd, Sm and Tb and differs from the transition metal provided on the silicate by ion exchange.

The metals borne on the mother material (i.e., the metal-containing silicate provided with transition metal by ion exchange) of the second catalyst layer exhibit $O_2$-spillover effect which improves activity of the catalytic convertor.

That is, as is well known, though the mother material, e.g., transition-metal-ion exchange zeolite is effective to decompose NOx, $O_2$ is formed by the decomposition. The $O_2$ thus formed is discharged as it is or is consumed in oxidizing coexistent reducing gases. However part of the $O_2$ poisons the mother material. The metals borne on the mother material cause the $O_2$ formed by the decomposition to spillover from the mother material, thereby keeping the catalytic activity of the mother material.

The first catalyst layer not only contributes to decomposition of NOx but also improves the catalytic activity of the catalytic convertor at low temperature by virtue of the precious metal borne on the mother material.

The NOx-treating efficiency of the mother material of the first and second catalyst layers tends to deteriorate at low temperature like the normal zeolite catalyst. However the precious metal borne on the mother material of the first catalyst layer can promote oxidizing reaction of HC even at relatively low temperature. As a result, the first and second catalyst layers are heated by the heat of reaction generated by oxidization of HC and accordingly the catalytic convertor in accordance with the present invention can treat NOx at high efficiency even if the temperature of the exhaust gas is low. That is, the active temperature range of the catalytic convertor is widened on the lower temperature side. Further the fact that the $O_2$ formed by the decomposition of NOx by the first and second catalyst layers is removed by oxidization of HC by the first catalyst layer serves to promote the NOx-treating reaction.

The metal provided to the mother material of the second catalyst layer and the precious metal provided to the mother material of the first catalyst layer can contribute to improvement in resistance to heat of the catalytic convertor.

As the transition metal provided to the mother material by ion exchange, Cu is preferable though other transition metals such as Co, Cr, Ni, Fe, Mn and the like may be employed.

As the metal-containing silicate for the first and second catalyst layers, zeolite (aluminosilicate) is preferable though other metal-containing silicates may be employed. For example, metal-containing silicates obtained by substituting a combination of Al and at least one of Fe, Ce, Mn, Tb, Cu, B and the like for Al (as the metal which forms the framework of the crystal) or non-alumino metal-containing silicates containing no aluminum may be employed. These metal-containing silicates are preferable from the viewpoint of improving the resistance to heat. From the viewpoint of improving the resistance to heat, H-type metal-containing silicate is preferable to Na-type metal-containing silicate, and especially H-type zeolite is preferable.

As the zeolite, synthetic zeolites such as A-type, X-type, Y-type, ZSM-5 and the like is preferable and natural zeolites such as mordenite may be employed.

As the metal to be provided to the mother material of the second catalyst layer, Co, Tb and Ce is preferable and Zr is more preferable. Combination of plurality of metals described above may be employed.

As the precious metal to be provided to the mother material of the first catalyst layer, Pt is preferable and other precious metals such as Rh, Pd and the like can be employed. Further the precious metal may be of a single metal or may be of a plurality of precious metals.

Preferably the precious metal is provided to the mother material of the first catalyst layer in a molar ratio to the transition metal (provided to the mother material by ion exchange) not smaller than 0.1 and more preferably in a ratio of about 1. Similarly the metal to be provided to the mother material of the second catalyst layer is preferably in a molar ratio to the transition metal (provided to the mother material by ion exchange) not smaller than 0.1 and more preferably in a ratio of about 1.

The base material on which the first and second catalyst layers are formed is preferably of cordierite though may be of other inorganic porous materials.

BRIEF DESCRIPTION OF THE DRAWINGS

FIG. 2 is a graph showing the result of NOx-treating test (heat resistance test) of the first embodiment of the present invention and the first to fourth controls after heat treatment.

DESCRIPTION OF THE PREFERRED EMBODIMENT

EXAMPLE 1

Figure 1:
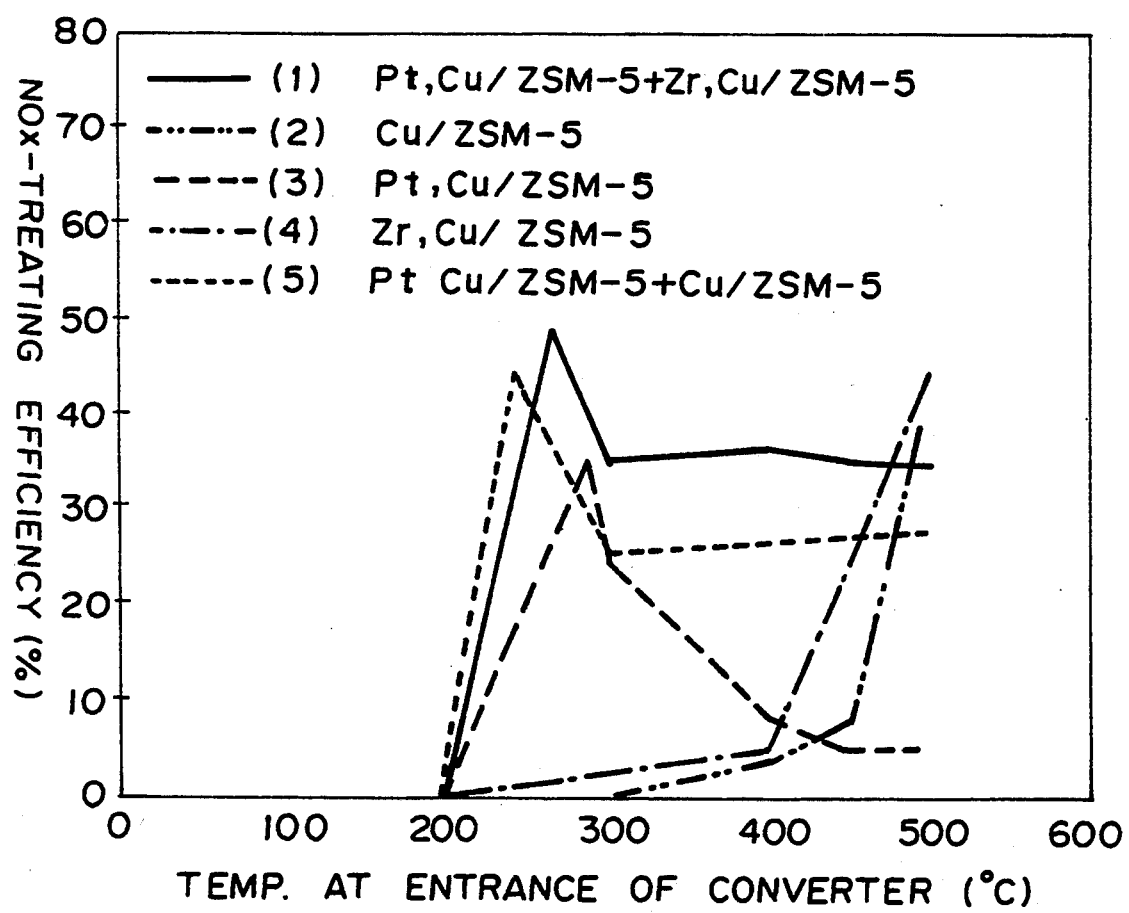
FIG. 1 is a graph showing the result of NOx-treating test (initial activity test) of the first embodiment of the present invention and the first to fourth controls.

A catalytic convertor in accordance with a first embodiment of the present invention was prepared in the following manner.

Na-type zeolite (ZSM-5) whose $SiO_2/Al_2O_3$ ratio was 30 in molar ratio was subjected to ion exchange process using aqueous solution of copper acetate (0.1 mol/l) and then dried, whereby Cu-ion exchange zeolite of 100% ion exchange factor was obtained.

The Cu-ion exchange zeolite thus obtained was mixed with 10 wt % of hydrated aluminum oxide (binder) and added with water. The slurry thus formed was coated on a cordierite honeycomb core by wash coating. The product was calcined at 500° C. for two hours, and then impregnated with aqueous solution of platinic chloride so that the molar ratio of the ion-exchanged Cu to Pt was 1:1, and then calcined at 500° C. for three hours. Thus a first catalyst layer (Cu-ion exchange zeolite provided with platinum) was formed on the cordierite honeycomb core.

The Cu-ion exchange zeolite obtained above was mixed with binder and added with aqueous solution of $ZrO(NO_3)_2.2H_2O$. The slurry thus formed was coated on the first layer by wash coating, and then the product was dried and calcined at 500° C. for three hours. Thus a second catalyst layer (Cu-ion exchange zeolite provided with zirconium) was formed over the first catalyst layer.

The aqueous solution of $ZrO(NO_3)_2.2H_2O$ was added in such an amount that the number of Zr atoms which existed in the slurry was substantially equal to the number of Cu-ions existing in the slurry. That is, 0.281 g ($1.05 \times 10^{-3}$ moles) of $ZrO(NO_3)_2.2H_2O$ was added per 1 g of Cu-ion exchange zeolite. It is preferred that 1 g of Cu-ion exchange zeolite exists per 2.7 to 3.1 cc of the slurry.

In this specification, the "ion exchange factor" means the exchange factor of the transition metal for the ion exchange site of the metal-containing silicate (zeolite), and is calculated to be 100% when the amount of the transition metal combined with the zeolite is equal to a half of Al contained in the zeolite with the transition metal given a valence of 2.

Another catalytic convertor was prepared, as a first control, by forming a single catalyst layer on a cordierite honeycomb core by wash-coating Cu-ion exchange zeolite obtained in the same manner as in the first embodiment.

Still another catalytic convertor was prepared, as a second control, by forming a single catalyst layer, which was the same as the first catalyst layer of the first embodiment, on a cordierite honeycomb core.

Still another catalytic convertor was prepared, as a third control, by forming a single catalyst layer, which was the same as the second catalyst layer of the first embodiment, on a cordierite honeycomb core.

Still another catalytic convertor was prepared, as a fourth control, by forming a first catalyst layer, which was the same as the first catalyst layer of the first embodiment, on a cordierite honeycomb core and forming a second catalyst layer on the first layer by wash-coating Cu-ion exchange zeolite obtained in the same manner as in the first embodiment.

In the first to fourth controls, the cordierite honeycomb cores are all the same as that employed in the first embodiment.

NOx-treating efficiencies of the first embodiment of the present invention and the first to fourth controls were measured using test gas whose air-fuel ratio was 22 (A/F=22) and whose spacial velocity was 55000 $h^{-1}$ (SV=55000 $h^{-1}$). (initial activity test) The result is shown in FIG. 1.

Further the first embodiment of the present invention and the fourth control were subjected to the same NOx-treating test after heat-treated at 650° C. for six hours. (heat resistance test) The result is shown in FIG. 2.

In FIG. 1, as can be understood from comparison of the NOx-treating-efficiency-temperature curve for the first control (curve 2) and that for the second control (curve 3), when the Cu-ion exchange zeolite is provided with Pt, the activity of the catalyst in a high temperature range is sacrificed though the activity of the catalyst in a low temperature range is improved. Further as can be understood from comparison of the NOx-treating-efficiency-temperature curve for the first control and that for the third control (curve 4), when the Cu-ion exchange zeolite is provided with Zr, the activity of the catalyst in a low temperature range cannot be improved though activity of the catalyst in its active range can be increased.

Further, in the fourth embodiment (curve 5) having the first catalyst layer which is the same as the catalyst layer of the second control and the second catalyst layer which is the same as the catalyst layer of the first control, the NOx-treating efficiency in a temperature range not lower than 300° C. cannot be satisfactorily improved (not higher than 30%) though the activity in a low temperature range is improved and that in a high temperature range is somewhat improved.

On the other hand, in the first embodiment of the present invention (curve 1), though the activity in the low temperature range is somewhat inferior to that of the fourth control, the activity in a temperature range higher than 250° C. is higher than that of the fourth control by about 10%. Thus in the first embodiment, the active temperature range of the catalytic convertor is widened and at the same time, the activity of the catalytic convertor is enhanced.

In FIG. 2, deterioration of the NOx-treating efficiency on the low temperature side is relatively small in either of the first embodiment and the fourth control after heat treatment. However deterioration of the NOx-treating efficiency on the high temperature side is relatively large in the fourth control after heat treatment and deterioration of the NOx-treating efficiency on the high temperature side is less in the first embodiment after heat treatment. From this result, it can be understood that Pt serves to improve the resistance to heat not only of the first catalyst layer but also of the second catalyst layer.

EXAMPLE 2

A catalytic convertor in accordance with a second embodiment of the present invention was prepared in the following manner.

That is, the Cu-ion exchange zeolite obtained in the same manner as in the first embodiment was mixed with binder and added with aqueous solution of $Fe(NO_3)_3 \cdot 9H_2O$. The slurry thus formed was coated on a first layer, which was formed in the same manner as in the first embodiment, by wash coating, and then the product was dried and calcined at 500° C. for three hours. Thus a second catalyst layer (Cu-ion exchange zeolite provided with iron) was formed over the first catalyst layer.

The aqueous solution of $Fe(NO_3)_3 \cdot 9H_2O$ was added in such an amount that the number of Fe atoms which existed in the slurry was substantially equal to the number of Cu-ions existing in the slurry. That is, 0.4242 g ($1.05 \times 10^{-3}$ moles) of $Fe(NO_3)_3 \cdot 9H_2O$ was added per 1 g of Cu-ion exchange zeolite.

A catalytic convertor in accordance with a third embodiment of the present invention was prepared in the following manner.

That is, the Cu-ion exchange zeolite obtained in the same manner as in the first embodiment was mixed with binder and added with aqueous solution of $Mg(CH_3COO)_2 \cdot 4H_2O$. The slurry thus formed was coated on a first layer, which was formed in the same manner as in the first embodiment, by wash coating, and then the product was dried and calcined at 500° C. for three hours. Thus a second catalyst layer (Cu-ion exchange zeolite provided with magnesium) was formed over the first catalyst layer.

The aqueous solution of $Mg(CH_3COO)_2 \cdot 4H_2O$ was added in such an amount that the number of Mg atoms which existed in the slurry was substantially equal to the number of Cu-ions existing in the slurry. That is, 0.2252 g ($1.05 \times 10^{-3}$ moles) of $Mg(CH_3COO)_2 \cdot 4H_2O$ was added per 1 g of Cu-ion exchange zeolite.

A catalytic convertor in accordance with a fourth embodiment of the present invention was prepared in the following manner.

That is, the Cu-ion exchange zeolite obtained in the same manner as in the first embodiment was mixed with binder and added with aqueous solution of $Tb(NO_3)_3 \cdot 6H_2O$. The slurry thus formed was coated on a first layer, which was formed in the same manner as in the first embodiment, by wash coating, and then the product was dried and calcined at 500° C. for three hours. Thus a second catalyst layer (Cu-ion exchange zeolite provided with terbium) was formed over the first catalyst layer.

The aqueous solution of $Tb(NO_3)_3 \cdot 6H_2O$ was added in such an amount that the number of Tb atoms which existed in the slurry was substantially equal to the number of Cu-ions existing in the slurry. That is, 0.4757 g ($1.05 \times 10^{-3}$ moles) of $Tb(NO_3)_3 \cdot 6H_2O$ was added per 1 g of Cu-ion exchange zeolite.

NOx-treating efficiencies of the second to fourth embodiments of the present invention were measured using test gas obtained by burning air-fuel mixture whose air-fuel ratio was 22 (A/F=22) in a combustion chamber whose surface volume ratio was 55000 $h^{-1}$. (initial activity test) The result is shown in FIG. 3.

Further the first embodiment of the present invention and the fourth control were subjected to the same NOx-treating test after heat-treated at 650° C. for six hours. (heat resistance test) The result is shown in FIG. 4.

Figure 3:
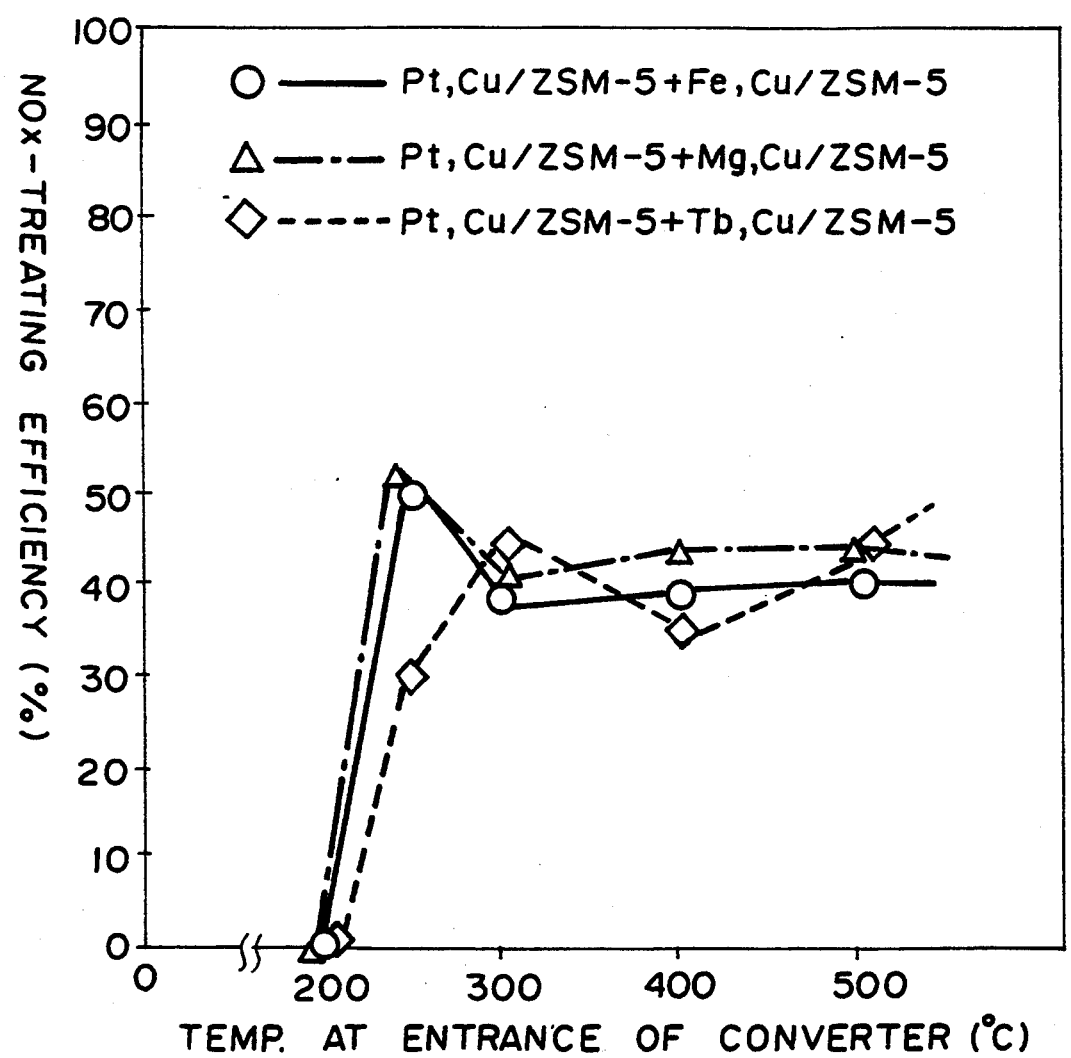
FIG. 3 is a graph showing the result of NOx-treating test (initial activity test) of the second to fourth embodiments of the present invention.
Figure 4:
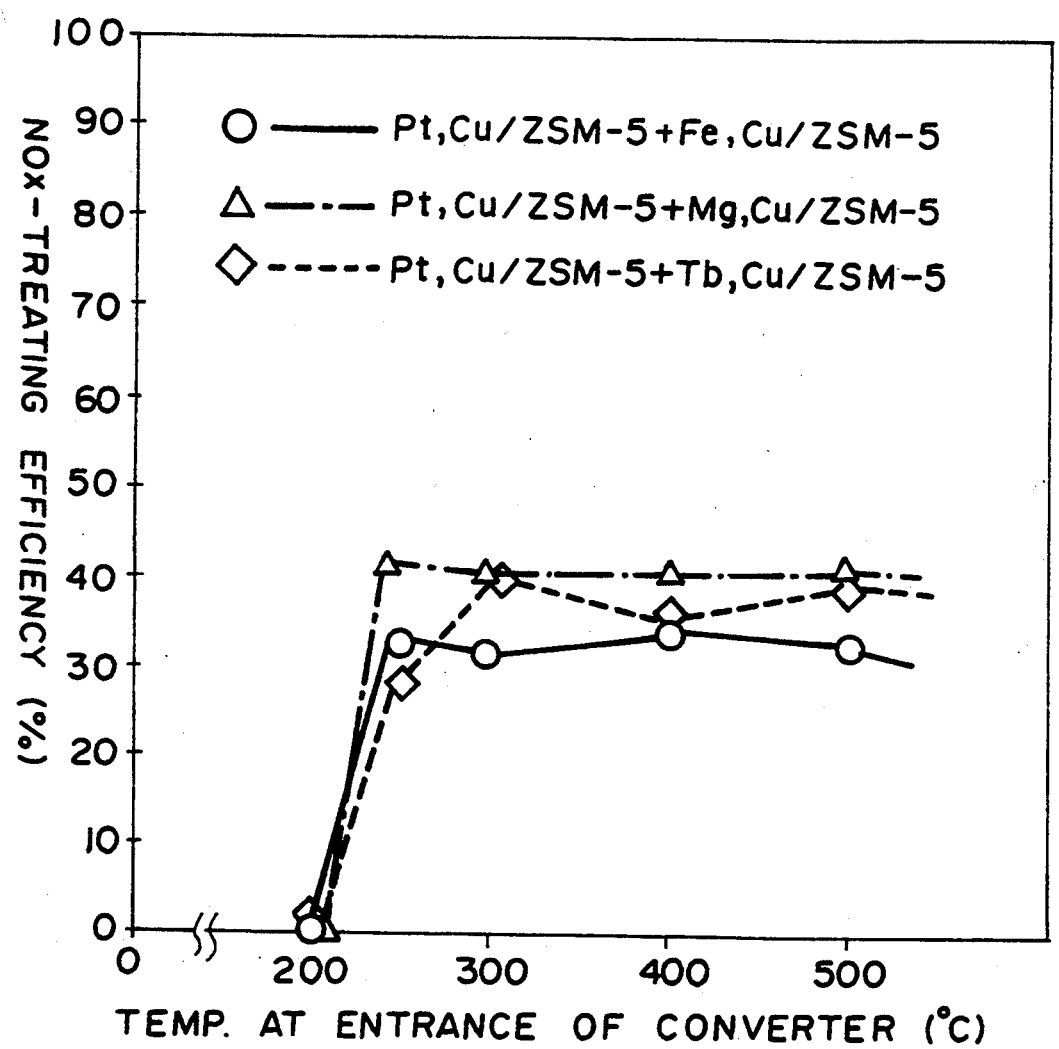
FIG. 4 is a graph showing the result of NOx-treating test (heat resistance test) of the second to fourth embodiments of the present invention after heat treatment.

As can be understood from FIGS. 3 and 4, as for the activity range and the catalytic activity, the second to fourth embodiments exhibited properties similar to those of the first embodiment. Further deterioration of the NOx-treating efficiency after heat treatment was small in either of the second to fourth embodiments. Thus it can be understood that also Fe (a transition metal other than Zr), Mg (a typical metal) and Tb (a lanthanoide metal) can contribute to improvement of the catalytic activity.

What is claimed is:

1. A catalytic converter for treating exhaust gas comprising
   a first catalyst layer formed on a base material and a second catalyst layer formed on the first catalyst layer,
   the first catalyst layer being composed of metal-containing silicate provided with transition metal by ion exchange and at least one precious metal borne on the silicate, and
   the second catalyst layer being composed of metal-containing silicate provided with transition metal by ion exchange and at least one metal borne on the silicate which is selected from the group consisting of Zr, Co, Cu, Cr, Mn, Y, Fe, Ni, V, Ti, Zn, Ca, Ba, Mg, La, Ce, Pr, Nd, Sm and Tb and which differs from the transition metal provided on the silicate by ion exchange and the precious metal borne on the silicate of the first catalyst layer.

2. A catalytic convertor as defined in claim 1 in which said metal-containing silicate for the first and second catalyst layers is Cu-ion exchange zeolite.

3. A catalytic convertor as defined in claim 1 in which said precious metal for the first catalyst layer is Pt.

4. A catalytic convertor as defined in claim 1 in which said at least one metal borne on the metal-containing silicate for the second catalyst layer is Zr.

5. A catalytic convertor as defined in claim 1 in which the number of the precious metal atoms for the first catalyst layer is substantially equal to the number of ions of the transition metal of the metal-containing silicate.

6. A catalytic convertor as defined in claim 1 in which the number of atoms of said at least one metal borne on the metal-containing silicate for the second catalyst layer is substantially equal to the number of ions of the transition metal of the metal-containing silicate.

7. A catalytic convertor as defined in claim 2 in which said precious metal for the first catalyst layer is Pt.

8. A catalytic convertor as defined in claim 7 in which said at least one metal borne on the metal-containing silicate for the second catalyst layer is Zr.

9. A catalytic convertor as defined in claim 2 in which said at least one metal borne on the metal-containing silicate for the second catalyst layer is Zr.

10. A catalytic convertor as defined in claim 5 in which the number of atoms of said at least one metal borne on the metal-containing silicate for the second catalyst layer is substantially equal to the number of ions of the transition metal of the metal-containing silicate.

11. A catalytic convertor for treating exhaust gas comprising
a first catalyst layer formed on a base material and a second catalyst layer formed on the first catalyst layer,
wherein the first catalyst layer is composed of Cu-ion exchange zeolite provided with transition metal by ion exchange and Pt borne on the zeolite, and
the second catalyst layer is composed of Cu-ion exchange zeolite provided with transition metal by ion exchange and Zr borne on the zeolite, which differs from the transition metal provided on the silicate by ion exchange.

* * * * *